United States Patent
Pollack et al.

(10) Patent No.: US 10,182,187 B2
(45) Date of Patent: Jan. 15, 2019

(54) COMPOSING REAL-TIME PROCESSED VIDEO CONTENT WITH A MOBILE DEVICE

(71) Applicant: Playvuu, Inc., Cave Creek, AZ (US)

(72) Inventors: Shane Pollack, Woodland Hills, CA (US); Joseph Takai, Los Angeles, CA (US); Alejandro Japkin, Buenos Aires (AR); Pablo Vasquez, Buenos Aires (AR)

(73) Assignee: Playvuu, Inc., Cave Creek, AZ (US)

( * ) Notice: Subject to any disclaimer, the term of this patent is extended or adjusted under 35 U.S.C. 154(b) by 0 days.

(21) Appl. No.: 14/740,222

(22) Filed: Jun. 15, 2015

(65) Prior Publication Data

US 2015/0365600 A1    Dec. 17, 2015

Related U.S. Application Data

(60) Provisional application No. 62/012,914, filed on Jun. 16, 2014.

(51) Int. Cl.
*H04N 5/262* (2006.01)
*H04N 5/232* (2006.01)
*H04N 5/235* (2006.01)

(52) U.S. Cl.
CPC ..... *H04N 5/23293* (2013.01); *H04N 5/23222* (2013.01); *H04N 5/2621* (2013.01); *G06T 2207/10016* (2013.01); *G06T 2207/20081* (2013.01)

(58) Field of Classification Search
CPC ............. H04N 5/2621; H04N 5/23222; H04N 5/23229; H04N 5/23293; G06F 3/048; H01N 1/00167
See application file for complete search history.

(56) References Cited

U.S. PATENT DOCUMENTS

| | | | | |
|---|---|---|---|---|
| 6,400,374 B2* | 6/2002 | Lanier | ....................... | G06F 3/14 345/630 |
| 8,332,429 B2* | 12/2012 | Poirier | .............. | G06F 17/30241 707/781 |
| 8,423,913 B1 | 4/2013 | Hogan et al. | | |
| 8,577,169 B2* | 11/2013 | Andrus | .................. | H04N 5/213 382/166 |
| 8,587,687 B2* | 11/2013 | Miyata | ................... | H04N 5/232 348/222.1 |

(Continued)

OTHER PUBLICATIONS

Advisory Action dated Jul. 12, 2017 for U.S. Appl. No. 12/953,350 of Pollack, S., filed Nov. 23, 2010.

(Continued)

*Primary Examiner* — Ngoc Yen T Vu
(74) *Attorney, Agent, or Firm* — Lynch LLP

(57) ABSTRACT

The present teaching relates to real-time manipulation of images and video captured on mobile devices, and in particular to composite graphical elements applied in real-time to captured images and/or video. Some embodiments contemplate a method comprising receiving a captured image and/or video from a portable multi-function device, applying processing in real time via a Quality Engine, applying processing in real time via an Image Engine, applying an overlay process in real time, applying a filter process in real time, storing and/or streaming the processed content, and sharing the processed content.

19 Claims, 9 Drawing Sheets

(56) References Cited

U.S. PATENT DOCUMENTS

| | | | |
|---|---|---|---|
| 8,805,164 B2 | 8/2014 | Shore et al. | |
| 9,087,269 B2 * | 7/2015 | Chinen | G06K 9/6267 |
| 9,374,517 B2 * | 6/2016 | Glasgow | H04N 5/232 |
| 9,385,324 B2 * | 7/2016 | Wu | H01L 51/006 |
| 9,641,760 B2 * | 5/2017 | LaScolea | G06F 3/005 |
| 2002/0171668 A1 | 11/2002 | Samra et al. | |
| 2003/0001846 A1 | 1/2003 | Davis et al. | |
| 2003/0049591 A1 | 3/2003 | Fechter et al. | |
| 2003/0051255 A1 | 3/2003 | Bulman et al. | |
| 2004/0011187 A1 | 1/2004 | Park | |
| 2004/0218100 A1 | 11/2004 | Staker et al. | |
| 2005/0066279 A1 | 3/2005 | LeBarton et al. | |
| 2006/0259588 A1 | 11/2006 | Lerman et al. | |
| 2007/0122786 A1 | 5/2007 | Relan et al. | |
| 2007/0211055 A1 | 9/2007 | Stein et al. | |
| 2007/0216712 A1 | 9/2007 | Louch | |
| 2008/0018665 A1 | 1/2008 | Behr et al. | |
| 2008/0053293 A1 | 3/2008 | Georges et al. | |
| 2010/0027961 A1 | 2/2010 | Gentile et al. | |
| 2010/0138480 A1 | 6/2010 | Benedetto et al. | |
| 2012/0017150 A1 | 1/2012 | Pollack et al. | |
| 2018/0075718 A1 * | 3/2018 | Modestine | G06T 7/70 |

OTHER PUBLICATIONS

Final Office Action dated Jun. 1, 2017 for U.S. Appl. No. 12/953,350 of Pollack, S., filed Nov. 23, 2010.

Final Office Action dated May 17, 2016 for U.S. Appl. No. 12/953,350 of Pollack, S., filed Nov. 23, 2010.

International Search Report and Written Opinion dated Feb. 28, 2012, for International Application No. PCT/US2011/043891, 8 pages.

Non-Final Office Action dated Feb. 15, 2013 for U.S. Appl. No. 12/953,350 of Pollack, S., filed Nov. 23, 2010.

Non-Final Office Action dated Sep. 9, 2016 for U.S. Appl. No. 12/953,350 of Pollack, S., filed Nov. 23, 2010.

Non-Final Office Action dated Jan. 2, 2018 for U.S. Appl. No. 12/953,350 of Pollack, S., filed Nov. 23, 2010.

* cited by examiner

COMPOSING REAL-TIME PROCESSED VIDEO CONTENT WITH A MOBILE DEVICE

CROSS-REFERENCE TO RELATED APPLICATION(S)

This application is entitled to the benefit of and/or the right of priority to U.S. Provisional Application No. 62/012,914, entitled "METHODS AND SYSTEMS FOR COMPOSING REAL-TIME PROCESSED VIDEO CONTENT WITH A MOBILE DEVICE", filed Jun. 16, 2014, which is hereby incorporated by reference in its entirety for all purposes. This application is therefore entitled to a priority date of Jun. 16, 2014.

BACKGROUND

Real-time video capture on a mobile device is currently limited to a very specific set of solutions. With existing solutions, users are able to capture live video and store the resultant clip to disk with a minimal number of editing enhancements available. Several third party applications for iOS, Android and Windows Mobile operating systems allow users to capture video and enhancements but the process is exceptionally complex and cumbersome either resulting in a loss of quality and/or a loss of creativity and flexibility due to the limits of the software.

SUMMARY

The present teachings contemplates a variety of improved methods and systems for using a mobile device for capturing video, enhancing video, modifying video and viewing video through a simplified application.

Real-time composition may be driven by a graphics image engine that uses a predefined set of image processing filters, layering operators, transparency operators, and geometric distortion functions. These operators may exist in a core system api library and may be predefined to achieve desired visual results. Operators may be parametrically driven allowing for inputs to define variations suited to specific image requirements. Operators handling bluescreen/greenscreen content, sharpening, contrast, brightness and other derivative filters are used by a .vuu file which contains the definition, parameters and order of the operators as well as a pointer to the menu thumbnail which may be instantiated on disk, representing the resulting image effect. In using filters and operators there also exists a tool for creating and overlaying photo frames over video images. Animation layers may be pre-composited and output as video files that are referenced by the .vuu definition file with instructions regarding composition layer placement. Video layers may be overlaid, placed behind other layers or serve as a moving or static frame image inside which the live camera captured video may be placed.

Once the user completes the capture operation they may modify the layered added content in order to obtain the best final composited video. Upon saving the modified content, the user may share the content through email or SMS Messaging or via a social media channel within the application or through various social media services such as Facebook®, Twitter®, etc.

BRIEF DESCRIPTION OF THE DRAWINGS

The present embodiments are illustrated by way of example and are not intended to be limited by the figures of the accompanying drawings. In the drawings.

DETAILED DESCRIPTION

Figure 1:
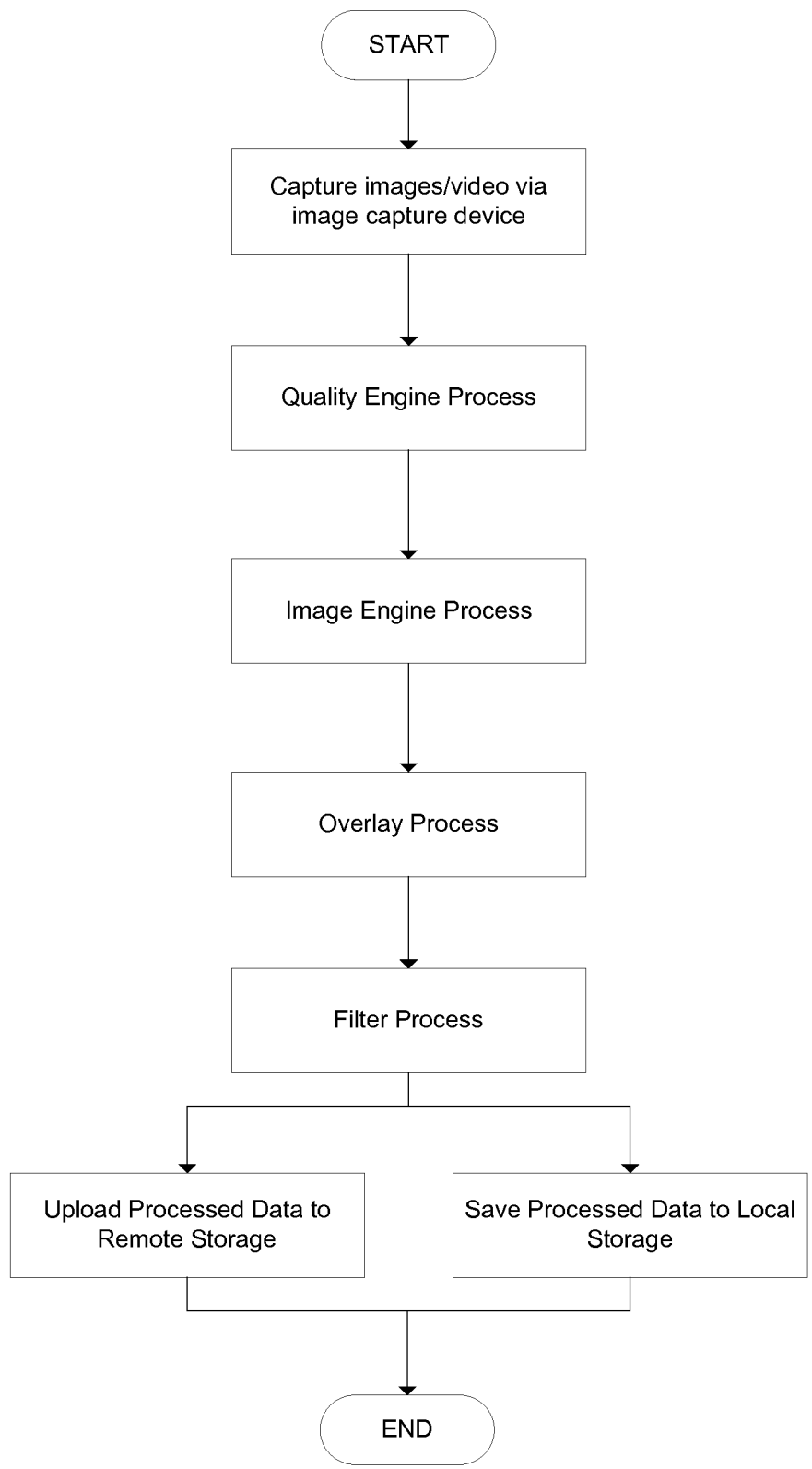
FIG. 1 shows a flow chart describing a method for composing real-time processed image and/or video content with a mobile device, according to some embodiments.

Hereinafter, it will be appreciated that specific embodiments of the invention have been described for purposes of illustration, but that various modifications may be made without deviating from the scope of the invention. Accordingly, the invention is not limited except as by the appended claims.

The term "image" may herein refer to a still image such as a digital photograph or moving images such as digital "video." The terms "image" and "video" are used interchangeably.

Real-Time Image Manipulation—Overview

Various embodiments of the present teaching allow a user to capture and process images and/or video in real-time or near real-time. Here, "processing" may include applying image processing filters, applying 2-dimensional ("2D") and/or 3-dimensional ("3D") geometric transformations, applying static and/or animated overlays, applying transparency operators, splicing and/or cropping, sharpening, color correction, contrast adjustment, or any other operations that manipulate captured images. Here "real-time" or "near real-time" means that the processes are applied to captured video and the output is displayed to the user almost instantaneously from the point of view of the user.

For example, a user may wish to capture video at a friend's birthday party and manipulate the video to add their own creative touch. In the past, in order to do so, the user would capture the video via a portable device with a video camera (such as a phone or a digital video camera), load the captured video into an application (either on the device itself or a separate device such as a laptop) and spend time manipulating the captured video using complex and cumbersome video editing tools. The process of manipulating the video would occur after the fact and far removed from the event itself, resulting in loss of creativity, loss of flexibility, and loss of connection to the event. Instead, using the present teachings, the user may capture video at their friend's birthday party and process the video on the capturing device as the event happens. For example, as the user's friend is blowing out the candles on the birthday cake, the user may select an animated overlay of party streamers that are instantaneously applied to the captured video as the event is occurring. Similarly, the user may select a 3-dimensional geometric transform so that the friend appears comically misshaped. Again, according to the present teachings, such processing would occur in real-time such that the user would instantaneously see the manipulated video in the view finder of their device as the video is captured.

According to various embodiments, processing and compositing of image elements may be driven by a graphics image engine that uses a predefined set of image processing filters, layering operators, transparency operators, and geometric distortion functions. These operators may exist in a core system API library and may be predefined to achieve a visually acceptable range of appearance results. Operators may be parametrically driven, allowing for inputs to define variations suited to specific image requirements. Operators handling bluescreen/greenscreen content, sharpening, contrast, brightness and other derivative filters are used by a specific file type (for example a .vuu file) which may contain definitions, parameters, order of the operators, as well as a pointers to the menu thumbnail which may be instantiated on disk, representing the resulting effect. In the use of filters and operators, there also exists a tool for creating and overlaying photo frames over video images. Animation layers may be pre-composited and output as video files that are referenced by the .vuu definition file with instructions regarding composition layer placement. Video layers may be overlaid, repositioned or serve as a moving or static frame image inside which the live camera captured video may be placed.

FIG. 1 shows a flow chart illustrating a method for composing real-time processed image and/or video content with a mobile device.

At step one, the method begins with capturing raw video and/or image data using a digital camera contained in a portable multi-function device ("herein referred to as a "device"). Image/video data may be captured using a digital camera contained within the device. The term "digital camera" may be understood to include any system in which an optical element (e.g. a lens, shutter, variable aperture diaphragm, etc.) is implemented to transfer and focus light to an optical sensing device (e.g. an image sensor, specifically a charge-coupled device (CCD) sensor or complementary metal-oxide-semiconductor (CMOS) sensor) in order to capture an image as digital data.

In most embodiments these optical elements and sensing devices are adjustable, allowing variation in the way in which image/video is captured and converted to digital data. For example, the variable aperture diaphragm may be opened and closed to vary the amount of light transferred to the optical sensing device. Similarly, the sensitivity (ISO) of the digital image sensor may be adjusted to vary the amount of light picked up by the sensor.

At step two, a Quality Engine analyzes the raw and/or processed image digital image/video data captured at step one and provides the user with real-time feedback for improving the quality of the image/video. The Quality Engine according to one embodiment is described in more detail herein under the section titled, "Quality Engine Processing."

At step three, an Image Engine analyzes the raw and/or processed digital image/video data captured at step one and automatically makes subtle adjustments in real-time to various parameters in order to improve the quality of the captured video. The Image Engine according to one embodiment is described in more detail herein under the section titled, "Image Engine Processing."

At step four, an Overlay process may receive the raw and/or processed digital image data and receive input from the user selecting a particular overlay. The Overlay process may then provide or render the overlay in real-time, process (including, but not limited to 2-D and 3-D geometric transformations) the raw and/or processed image/video data in real-time for use with the overlay, and output the overlay and reprocessed image/video data. The Overlay process according to one embodiment is described in more detail herein under the section titled, "Overlay Processing."

At step five, a Filter process may receive the raw and/or processed digital image data and receive input from the user who selects a particular filter. The Filter process may then process (including, but not limited to 2-D and 3-D geometric transformations, color correction, white balance, etc.) the raw and/or processed image/video data in real time and output the re-processed image/video data. The Filter process according to one embodiment is described in more detail herein under the section titled, "Filter Processing."

At step six, the outputs form each of the above described sub processes may be composited to form a composited processed image/video.

At steps five through seven, the composited processed image/video data, having passed through the processing pipeline described above may be displayed to the user in real-time as they are capturing the image/video, stored to a local storage device on the capturing device, live streamed to one or more remote devices or to a remote computing platform, or any combination thereof.

The processing pipeline described above provides an illustration of conceptual steps comprising a method for composing real-time processed image/video content with a mobile device. It shall be understood that the order of processing may differ, that processes may run serially or in parallel, and that multiple similar processes (e.g. multiple stages of Filter processing) may be applied depending on the particular implementation and the capabilities of the device and systems.

Figure 2:
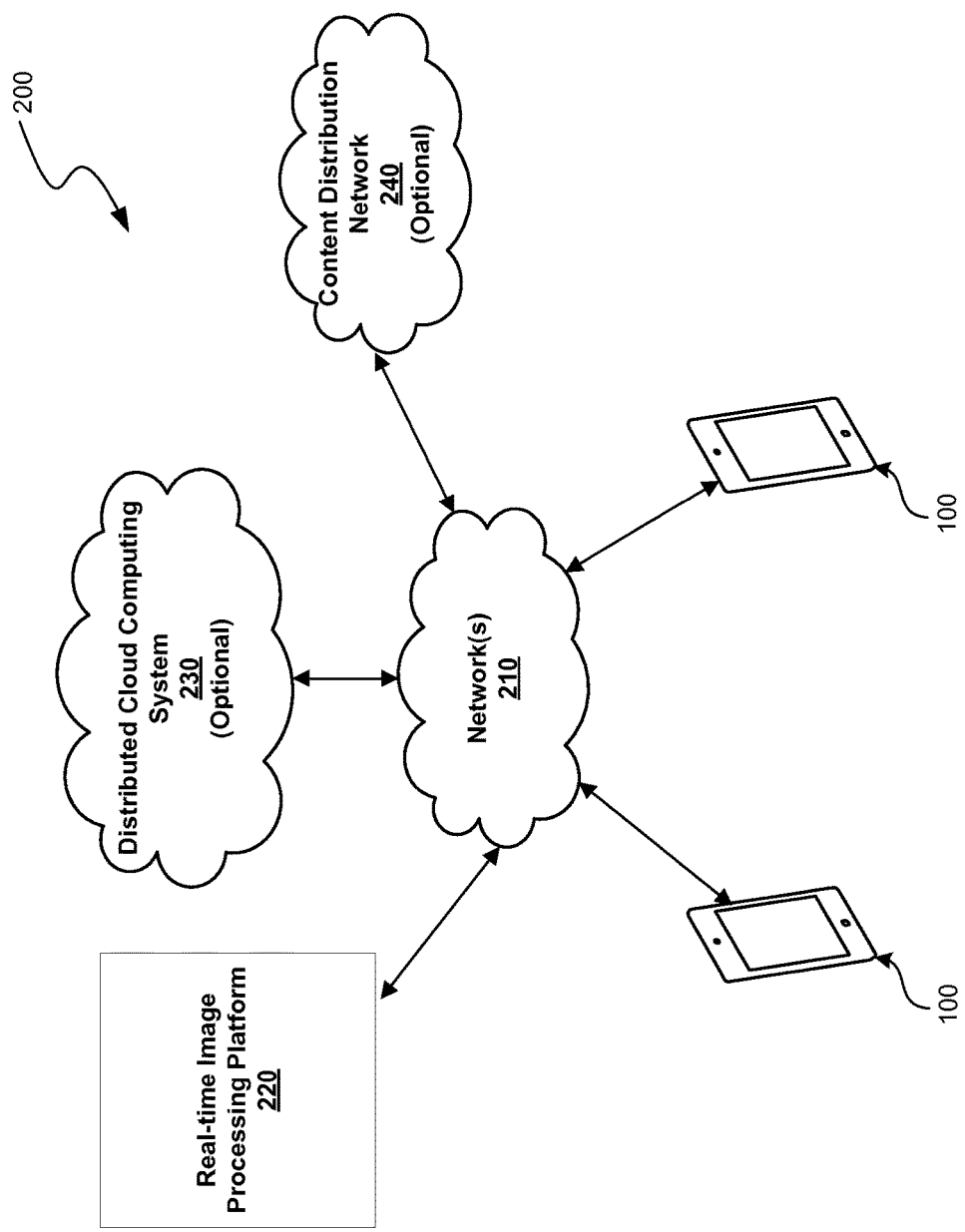
FIG. 2 illustrates a diagram of a system suitable for facilitating the composing of real-time processed video content with a mobile device, according to some embodiments.

FIG. 2 illustrates a diagram of a system 200 suitable for facilitating the composing of real-time processed video content with a mobile device, according to some embodiments. The system may include one or more portable multi-function devices (herein referred to as "mobile device or device(s)") 100, such as a smart phone (e.g. iPhone®, Android® phone, or Windows® phone), tablet device (e.g. iPad®, Android® tablet, or Windows® tablet), laptop (e.g. Macbook® Air), or the like. Additional information on suitable devices is described herein under the section titled "Portable Multi-Function Device." The devices may be connected to a real-time processing platform 220 via one or more networks 210. The device 100 may optionally be connected to a cloud computing platform 230 via the one or more network 210. The devices 100 may optionally be connected to content distribution network 240 via the one or more networks 210.

Figure 3:
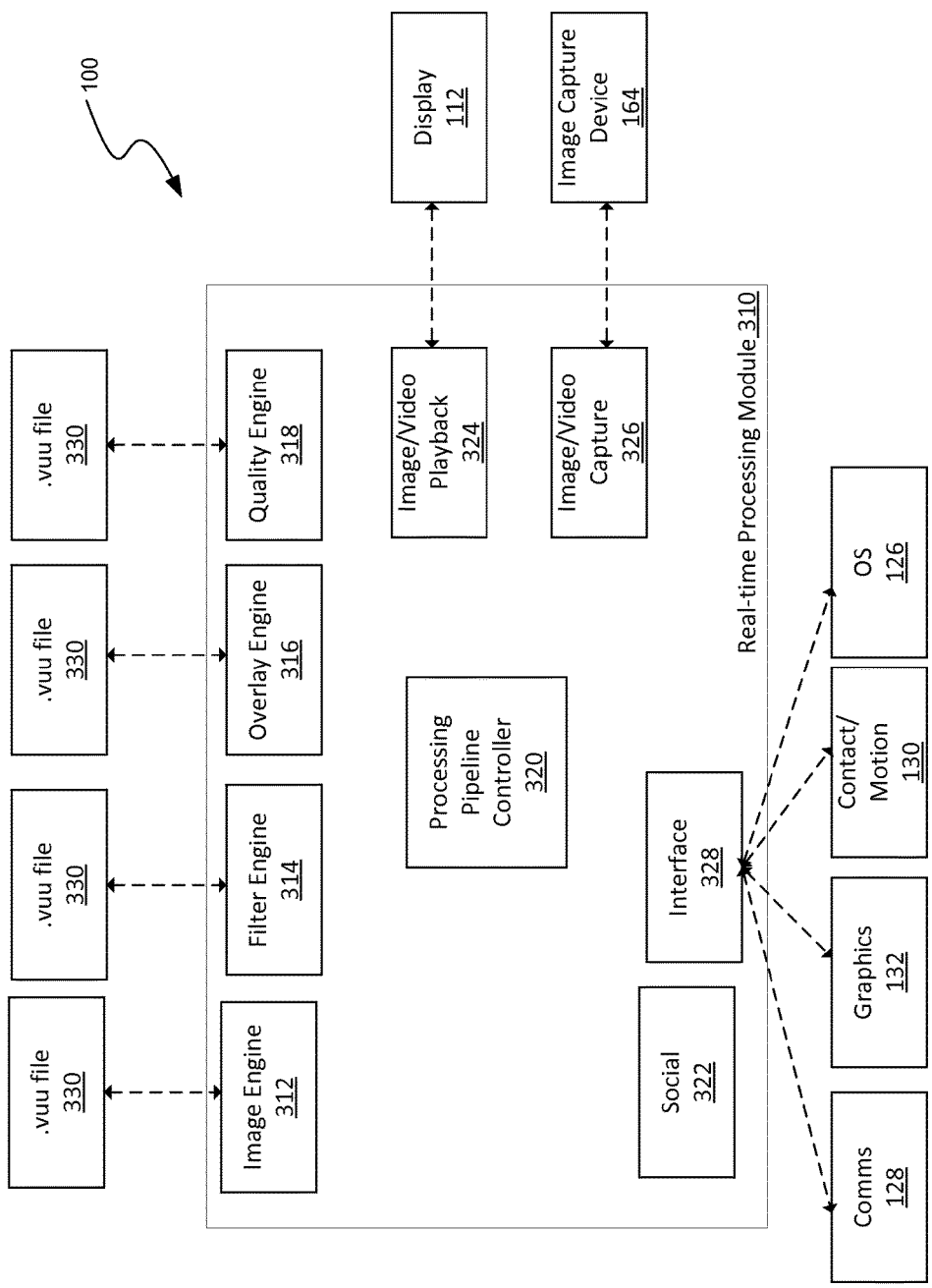
FIG. 3 is a conceptual diagram of a software architecture for composing real-time processed video content with a mobile device, according to some embodiments.

FIG. 3 illustrates a software architecture 300 for composing real-time processed video content with a portable multi-function device.

Figure 9:
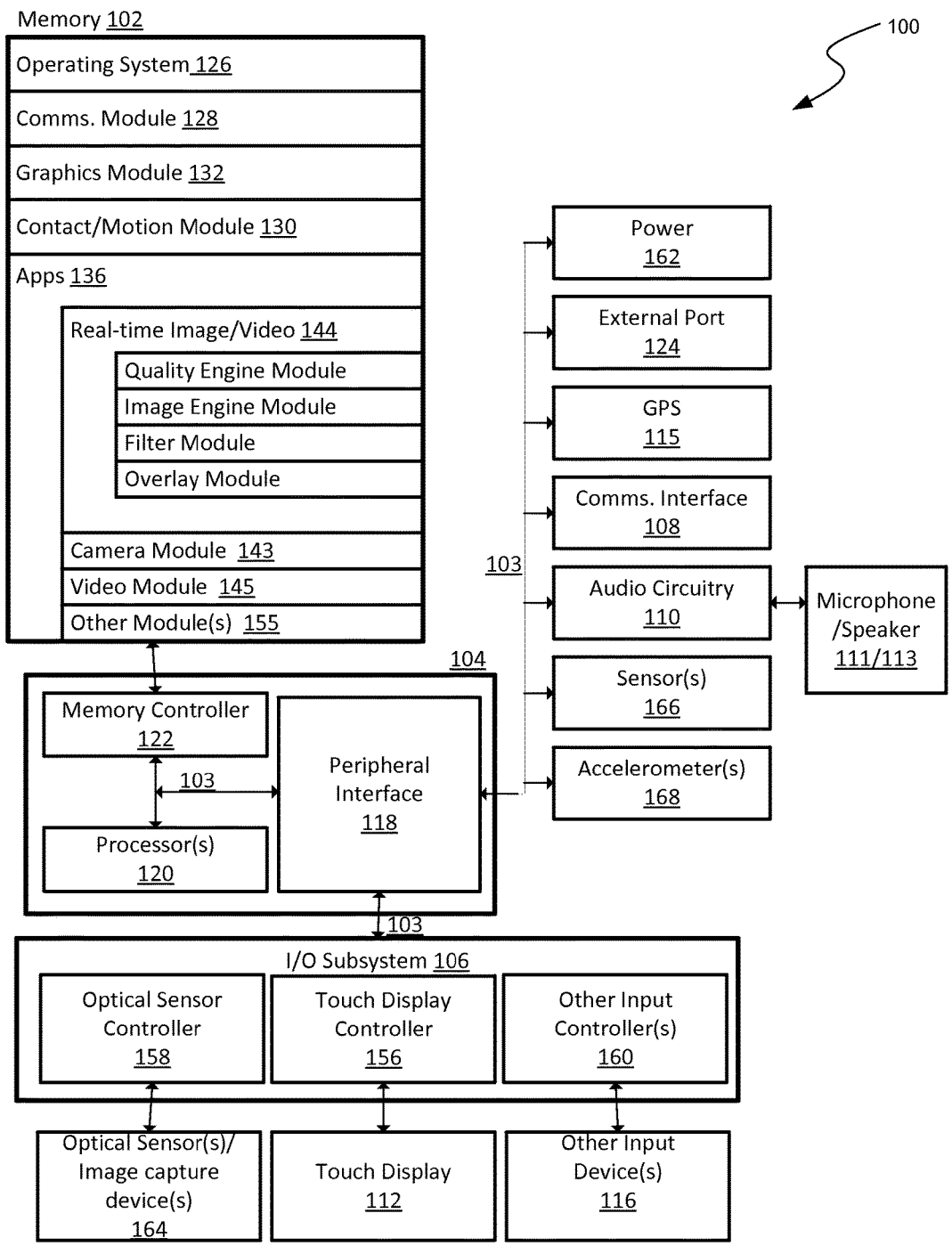
FIG. 9 is a block diagram illustrating an example mobile device in accordance with accordance with some embodiments

According to some embodiments a real-time processing module 310 may include software and or hardware components for composing processed video content in real time. Module 310 may be the same as module 144 shown in FIG. 9. In the illustrated example, module 310 includes an image engine 312, a filter engine 314, an overlay engine 316, an quality engine 318, a processing pipeline controller 320, a social media module 322 a playback module 324, an image capture module 326, and an interface 328 to other modules stored in the memory of a local or remote computer device (e.g. memory 102 of mobile device 100 as shown in FIG. 9).

Image Engine 312, Filter Engine 314, Overlay Engine 316, and Quality Engine 318 may include instructions for processing captured video in real time according to the Image Engine process, Quality Engine process, Overlay process, and Filter process described in more detail herein. Module 310 may include a processing pipeline controller 320 for managing the pipeline of processes by engines 312-318. As will be described adjustments to the video and/or generated overlays may made by engines 312-318 may be saved to one or more common definition files 330 (e.g. a .vuu file).

Figure 4:
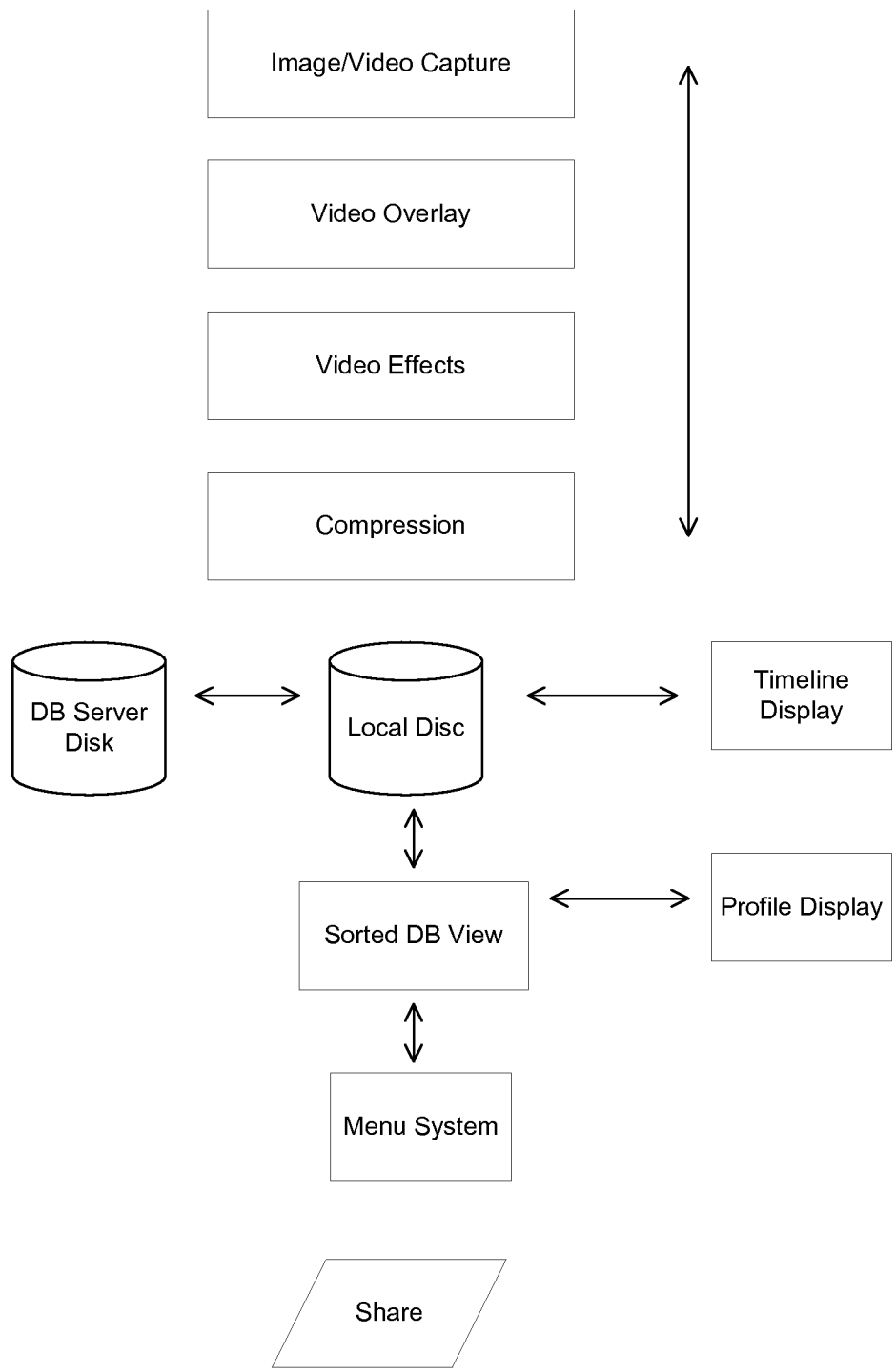
FIG. 4 illustrates a user application flow for composing real-time processed video content with a mobile device, according to some embodiments.

FIG. 4 illustrates a user application flow for composing real-time processed video content with a portable multi-function device.

Quality Engine Processing

Embodiments of the present teaching may include processing image/video data by a Quality Engine. In general, the Quality Engine may provide the user with real-time feedback as the user captures images or video using a device. The Quality Engine analyzes the quality of the images/video captured and provides the user with a rating and/or recommendations intended to guide the user to capture higher quality images/video. For example, the Quality Engine may provide feedback to the user through a star rating system where an overlay including three animated stars is composited with the captured live video and displayed to the user through a view finder. In this example, while capturing live video, the Quality Engine would analyze the quality of the captured video and increase or decrease the displayed star rating as the user is capturing the video. Accordingly, based on the displayed star rating, the user may be incentivized to make adjustments to their mode of capture, for example, by changing the orientation of the capturing device or making manual adjustments to specific parameters, for example contrast.

According to certain embodiments, the Quality Engine may be implemented as a software module or combination of software and hardware instantiated on a user device, on a remote device, on a number of devices in a distributed fashion, or any combination thereof. The functionality of Quality Engine may be accessible via an application programming interface (API) thereby allowing different types of device and software platforms to access its functionality. According to some embodiments, the Quality Engine module may be instantiated completely or partially in microcode on the device hardware itself.

Figure 5:
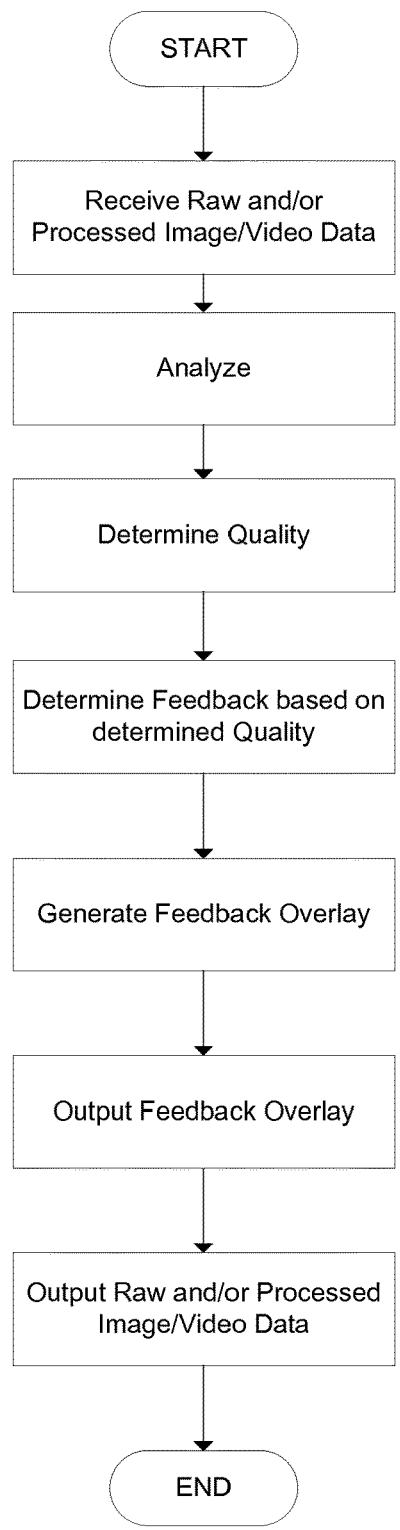
FIG. 5 shows a flow chart describing a method by which a Quality Engine may process image and/or video data in real-time, according to some embodiments.

FIG. 5 shows a flow chart describing a method by which a Quality Engine may process image and/or video data in real-time, according to some embodiments.

At step one the Quality Engine may receive captured raw and/or processed image/video data.

At step two the Quality Engine may analyze the received image/video data and determine a quality of the image/video data. Here, the quality of the image/video data may be based on a number of factors.

For example, the quality may be based at least in part on objective criteria. A common objective criteria for determining the quality of a captured image/video data is the balance of tonal distribution within the captured image/video. Such distribution is often graphically represented in the form of an image histogram. In an image histogram, the horizontal axis of the graph represents a range of tonal distribution, while the vertical axis represents the number of pixels at that particular tone. What results is chart conveying information regarding the tonal variation in a given set of image/video data. For example, an image histogram, having most of its data points on the left side, may indicate a dark underexposed image. Conversely, an image histogram in which most of the data points fall on the right side may indicate a bright and perhaps overexposed image. A more balanced image histogram may therefor indicate a spread of tonal variation indicating greater contrast and therefore a higher quality image. The above example serves only to illustrate that the quality of an image may be based at least in part on certain objective criteria. The Quality Engine may draw on the above analysis, but it may also analyze against other objective criteria. For example the variation in motion of a given shot indicating a steady or unsteady capture, balance of colors in a given shot, color saturation, variation in luminance within a given shot perhaps indicating an optimal or sub-optimal lighting source configuration (e.g. a shot of a subject individual with the sun at their back), focus of the shot, or any other criteria or combination of criteria tending to indicate an objective quality of the captured image/video. Further examples of objective criteria include, but are not limited to, optical flow, face detection, red-eye detection, depth estimation, and silhouette estimation.

A quality determination may also be based on subjective criteria. The quality of a captured image/video may often be a matter of individual human perception. For example factors such as the framing of a shot, the orientation of subjects, the lighting design or choreography may be perceived by a human as indicating a higher quality or lower quality shot.

A particular example of a subjective criteria according to one embodiment of the present disclosure is the Headshot Tuner functionality of the Quality Engine. The orientation of a human subject's body, specifically the direction of the head and face is of particular importance in determining a subjective quality of a given shot as human perception is often focused on representations of other humans. The Quality Engine may analyze the orientation of a human subject in a number of ways. For example, techniques for face detection through software based image analysis may be utilized to detect the presence of human face in a given shot. Tools for face detection currently exist for a number of device platforms, for example Core Image, part of the Apple® iOS device platform provides certain face detection functionality. Often such tools may be currently utilized for focusing a shot, performing limited color correction (e.g. red-eye removal), or cropping a shot. The Quality Engine performs analyses beyond mere detection and/or recognition to determine an orientation of a subject's face and a quality level based on that orientation. For example, the quality engine may determine a subjective low quality of a given shot in which the human subject's face is partially out of the frame of capture and oriented at an upward angle. Similarly, the Quality Engine may determine a subjective high quality of a given shot where the subject's face is centered in the frame of capture and the subject's eyes are pointed at the capturing camera. These examples are included to illustrate the factors that may contribute to a subjective low or high quality determination, but are not intended to convey that the Quality Engine would actually arrive at said determination in any given situation.

An issue with any subjective determination based on human perception is that the determination may differ from one perceiving human to the next. Therefore analysis based on subjective criteria may be further enhanced by applying polling and/or statistical methods to arrive at determinations more closely approximating generally held views of image/video quality.

According to some embodiments, the Quality Engine may be calibrated based on existing statistical data. For example a poll may be held in advance amongst a set of leading cinematographers or photographers. Their subjective input into the components of a high quality/image video may then inform the Quality Engine to analyze and provide recommendations to the user to improve quality based on the collective knowledge of these leading experts. Such an implementation would in essence place a virtual expert cinematographer/photographer over the user's shoulder to view their capture and provide constructive criticism.

Similarly, the Quality Engine may incorporate continuously gathered data associated with image/video quality and thereby constantly evolve the criteria against which it determines quality. Consider the following example; a system according to present teachings may include one or more users capturing images/video via devices and uploading the images/video to a social networking platform. The one or more users, forming a community on the social networking platform, may view each other's images/videos and provide feedback (e.g. in the form of comments, upvotes, likes, etc.). Such a system may then aggregate the community feedback data with analyses of the uploaded images/video in order to inform and adjust calibration of the Quality Engine. In this sense the Quality Engine and/or a system utilizing the Quality Engine may employ a technique generally described as machine learning to learn from gathered data and in effect predict a viewer's perceived quality level when presented with a new image/video.

According to some embodiments, the above methods may incorporate additional data in order to better predict perceived quality. For example, the Quality Engine and/or a system utilizing the Quality Engine may in addition to community feedback, collect additional data, including but not limited to, the software and/or hardware capabilities of the capturing device (e.g. type of lens, type of image sensor, type of GPU, etc.), the geographical location of the capturing device at the time of capture, the date and time the image/video was captured, etc. Aggregating and correlating this data, the Quality Engine and/or a system utilizing the Quality Engine may determine patterns in perceived quality. For example the Quality Engine and/or a system utilizing the Quality Engine may recognize that images/video captured using an iPhone® 5s outdoors in the northern hemisphere in the evening during summer months generally have a higher perceived quality than images/video captured using an Android® device indoors in the Northern Hemisphere in the morning during winter months. Using this information, the Quality Engine may be calibrated to fit the capture of images/video under a particular set of conditions.

According to some embodiments, the above methods may incorporate data gathered from other sensors associated with the mobile device or another device. For example, on the quality engine process may receive sensor data from one or more sensors associated with the mobile device. Sensors may include, but are not limited to, accelerometer, gyroscope, ambient light sensor, magnetometer, depth sensor, and proximity sensor. The sensor data may then be incorporated into the analysis of the captured video. For example, an ambient light sensor may gather data that may directly inform the level of ambient light in the physical environment without the need for additional processing of the captured image/video. Similarly, data from an accelerometer and/or gyroscope may be used to determine the steadiness of an image or the orientation of the image capture device and/or filmed subject.

At step three, the Quality Engine, having analyzed the captured image/video may, in real time, determine an appropriate feedback mechanism intended to guide the user towards improving the quality of the captured image/video. For example, according to one embodiment, the Quality Engine may implement a feedback mechanism in the form of a relatively simple 3-star symbol display. According to such an embodiment, a single red star may indicate poor capture quality due to a number of conditions (e.g. low light, poor contrast, extreme backlighting, etc.). Similarly, two yellow stars may indicate improved quality in response to user adjustments, but with room for further improvement. Finally three green stars may indicate a high level of quality based on the particular preset objective and/or subjective criteria of the Quality Engine.

The above example illustrates a simple feedback mechanism that, while supplying minimal guidance, provides the user with a quick assessment of their current capture conditions. According to other embodiments the feedback mechanism may be more complex. For example, consider the Head Tuner functionality previously discussed. Here, the Quality Engine may be preset or determine automatically in real time to provide more detailed instruction to the user in order to improve quality. Recall the example of the poor quality capture in which a human subject's face is partially out of frame and angled upward. In this instance, the Quality Engine may provide feedback in the form of a visual template displayed to the user suggesting an optimal composition. A visual overlay of an outline of a head may appear near the middle of the frame as displayed to the user and prompt the use make adjustments to the orientation of the device such that the human subject's head falls within the boundaries of the outline. Further, the Quality Engine may provide the user with express instructions (either visually using symbols and or text, or audibly through spoken word) guiding the user to precise adjustments in order to improve quality.

At step four the Quality Engine may provide the feedback mechanisms previously discussed in the form of visual or audible overlays to be composited with the raw and/or processed captured video. For example the three star rating mechanism previously discussed may be provided as an overly comprising pre-rendered animations output as an overlay video. Alternatively, where the capabilities of the device and/or system permit, complex 3-D visual overlays may be rendered in real time using the accelerated rendering capabilities of a graphics processing unit (GPU).

At step five the Quality Engine may output the processed image/video data and the feedback mechanism overlay for real-time compositing.

Image Engine Processing

Embodiments of the present teaching may include processing image/video data by an Image Engine. In general, the Image Engine, similar to the Quality Engine may analyze captured raw and/or processed image/video and determine a level of quality of the image/video. However, in contrast to the Quality Engine, the Image Engine automatically makes adjustments to certain parameters in order to improve quality based on key photography and cinematography techniques.

According to certain embodiments, the Image Engine, like the Quality Engine, may be implemented as a software module or combination of software and hardware instantiated on a user device, on a remote device, on a number of devices in a distributed fashion, or any combination thereof. The functionality of Image Engine may be accessible via an application programming interface (API) thereby allowing different types of device and software platforms to access its functionality. According to some embodiments, the Image Engine module may be instantiated completely or partially in microcode on the device hardware itself.

Figure 6:
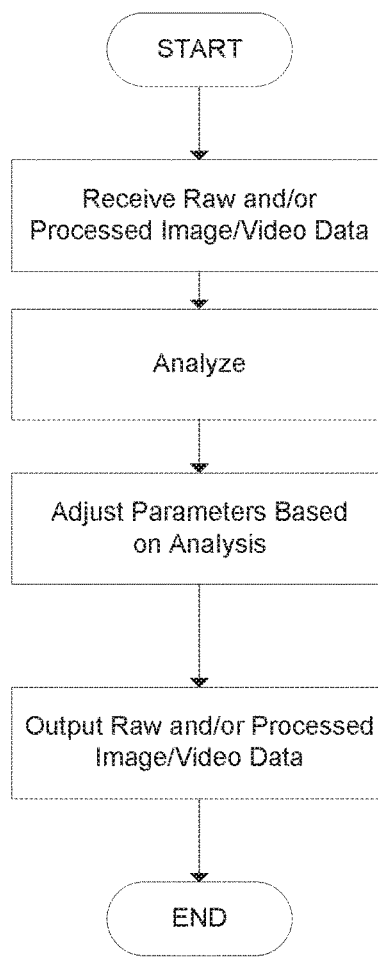
FIG. 6 shows a flow chart illustrating a method by which the Image Engine may process image/video data in real-time, according to some embodiments.

FIG. 6 shows a flow chart illustrating a method by which the Image Engine may process image/video data in real-time, according to some embodiments.

At step one the Image Engine may receive captured raw and/or processed image/video data.

At step two the Image Engine, similar to the Quality Engine, may analyze in real time the quality of the captured image/video based on objective and/or subjective criteria. Additional details on methods of analysis against objective and/or subjective criteria are discussed in the previous section titled, "Quality Engine Processing." Although the general methods of analysis may be conceptually similar to those of the Quality Engine, it shall be understood that according to some embodiments, the Image Engine may be configured to perform separate analysis from that of the Quality Engine based on different criteria.

At step three, the Image Engine may automatically adjust in real time certain parameters in order to improve the quality of the captured image/video data. According to some embodiments the Image Engine, may adjust certain components of the optical system. For example, if the captured image/video is determined to be too dark, the Image Engine may cause the diaphragm component of the optical system (described in more detail herein under the section titled, "A Portable Multi-Function Device") of the device to open wider thereby increasing the aperture. Alternatively, given a similar situation of low light, the Image Engine may cause a flash device associated with the portable multi-function device to illuminate. Further, given a similar situation, the Image Engine may cause an increase in sensitivity of the image sensor (ISO) in order to brighten the image.

According to some embodiments, the Image Engine may also perform real-time algorithm-based image processing via software and/or hardware in order to improve the quality of the captured image/video. For example, where the tonal balance of the captured image/video is determined to be sub-optimal, the Image Engine may perform real-time image processing, including but not limited to, increasing the contrast, sharpening the image, performing color correction, balancing white levels.

At step four, the Image Engine may output the now processed and/or re-processed image/video data.

Overlay Processing

Embodiments of the present teaching may include applying selected overlays to captured image/video data in real time. Recall the example previously discussed in which a user, while filming a friend's birthday party using a portable multi-function device, applies in real-time fun graphical elements (e.g. animated streamers) as an overlay to the video as it is captured. Similarly, overlay processing may include both the real-time application of graphical overlay elements as well as real time processing of the captured image/video (e.g. through filters, 2-D and 3-D geometric transformations, etc.) in order to prepare the captured image/video for the selected overlay. For example, a system in accordance with embodiments of the present teaching may present to the user an option to select a "Times Square" overlay to apply to their captured video in real time. When selected, the Times Square overlay may display to the user a pre-recorded video of the real Times Square with the many large digital screens and billboards in view. The video captured by the user may be displayed to the user in real time as if it were being displayed on one or more of the digital billboards in Times Square.

According to certain embodiments, real-time image overlay processing may be performed by a software module or combination of software and hardware instantiated on a user device, on a remote device, on a number of devices in a distributed fashion, or any combination thereof. Image overlay processing functionality may be accessible via an application programming interface (API) thereby allowing different types of device and software platforms to access its functionality. According to some embodiments, a software module implementing image overlay processing may be instantiated completely or partially in microcode on the device hardware itself. According to some embodiments, the user may search for and download new pre-defined overlays using a device. New pre-defined overlays may be downloaded via a network from a platform server(s), directly from other users, or from third-party content providers.

Figure 7:
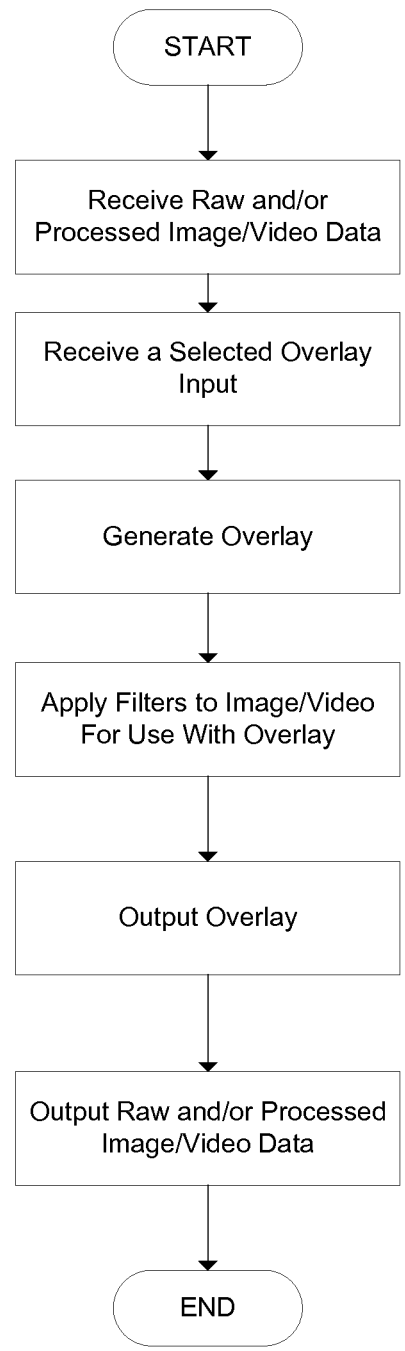
FIG. 7 shows a flow chart describing a method by which an overlay may be applied to captured image/video data in real time, according to some embodiments.

FIG. 7 shows a flow chart describing a method by which an overlay may be applied to captured image/video data in real time, according to some embodiments.

At step one, the overlay process may comprise receiving captured raw and/or processed image/video data.

At step two, the overlay process may comprise receiving input from a user, or another process according to the present teaching, selecting a particular overlay to be applied to the captured image/video in real time. For example, an overlay such as the previously discussed birthday streamer overlay may be requested via an input by a user. Alternatively, an overlay may be requested by another process, for example by the Quality Engine in order to display an appropriate graphical feedback mechanism to the user as an overlay.

At step three, the overlay process may comprise defining an appropriate overlay based on the overlay selected at step two. Overlays may comprise a number of graphical elements including but not limited to, pre-recorded video capturing a time-shifted event, previously captured static images, pre-rendered animations output as video files, pre-rendered static images, and live-rendered graphical elements (including 3-D graphical elements). Overlays may further comprise sound (e.g. as part of a pre-recorded video) or text. According to some embodiments a selected overlay may comprise a number of different elements. For example the example Times Square overlay previously discussed may include pre-recorded video elements such as video of times square, pre-rendered static photographs such as an alternative photograph of the sky to replace that in the pre-recorded video, and pre-rendered animations such as a lens flare effect. In such a situation overlay elements may be pre-composited and available as a pre-defined overlay or may be provided as a number of pre-defined overlays and composited in real time as the user captures image/video data. In either case, the provided overlays may be output as overlay files and referenced by a common definition file (e.g. a .vuu file) during the composition process with specific instructions regarding composition layer placement.

At step four, the overlay process, having defined the overlay(s) to be applied, may comprise processing the captured image/video data for use with the defined overlay(s). As previously discussed, processing may include, but is not limited to, applying 2-D and/or 3-D geometric transformations, applying transparency operators, splicing and/or cropping, sharpening, color correction, contrast adjustment, or any other operations that manipulate the captured image/video data. It will be understood that a description of filter process is described here at step 4 of the overlay process in order to illustrate the real-time manipulation of captured image/video data where an overlay is applied. Such processes may be the same as those described in the next section titled, "Filter Processing." Again as described with regards to FIG. 1 the overall processing pipeline described provides an illustration of conceptual steps comprising a method for composing real-time processed image/video content with a mobile device. It shall be understood that the order of processing may differ, that processes may run serially or in parallel, and that multiple similar processes (e.g. multiple stages of Filter processing) may be applied depending on the particular implementation and the capabilities of the device and systems. Filter processing is described in further detail herein under the section titled "Filter Processing."

For example, consider again the Times Square overlay. As one may recall, in this example, the overlay is intended to give an effect to the user that the live captured image/video is appearing on one or more large displays located in times square. In order to accomplish this effect a number of filter processes may be applied. First, a real time 3D geometric transform may be applied to the captured image/video to place the rectangular frame of the captured image/video in the perspective of the framed display appearing in the video of Times Square. Second, a series of brightness, contrast, saturation, and color balance operations may be applied to the captured image/video so that it may appear to have the luminance of a large display screen located in Times Square.

According to some embodiments instructions regarding the real time processes to be applied to the captured image/video data may be predefined and associated with a particular preset overlay. For example, the Time Square Overlay previously discussed, may include or reference a predefined set of processing instructions based on previously performed analysis of the pre-recorded Times Square video. The predefined set of processing instructions may be set in order to achieve a particular desired effect.

According to some embodiments, the overlay processing step may also comprise real-time image analysis of both the captured image/video as well as the selected overlay elements in order define in real-time processes to be applied to the captured image/video in order to make it fit with the selected overlay(s).

For example, a particular overlay process may produce a "Chroma key" (often referred to as blue-screen or green-screen) like effect without the use of a background screen. Chroma key compositing is the widely used practice of filming a subject in front of a flat uniformly-colored screen, compositing that captured video with other captured video or computer-rendered effects, and setting the color range of the backdrop screen to transparent in the top layer such that in the final product the subject appears before the background composited video or rendered effects. Chroma key compositing is often performed in post-production, but in some cases may be performed in real time (e.g. a weather person filmed in front of a green-screen while interacting with CGI elements composited in real time). Here, a similar effect may be achieved without the use of green screen or blue screen through real time image analysis, overlay processing and/or filter processing.

Consider as an example, an overlay similar to that of the previously discussed Times Square overlay. Here, instead of incorporating pre-recorded video from Times Square, the overlay may incorporate live-streamed video captured by another user siting at a major league baseball game at AT&T park. A second user at a different location may capture video of their daughter's little league game using a portable multi-function device and select the live stream from AT&T park as an overlay to apply to their captured video in real time. The desired effect here may be such that as the second user captures video at the daughter's little league game, it appears in real time as if the Jumbotron at AT&T park is displaying the daughter's little league game. Because the video from AT&T park is live-streamed without the use of a green screen, specific filtering and compositing instructions may not be available in advance. Instead, the overlay process may comprise analyzing in real time the live stream overlay, analyzing in real time any additional overlay elements, analyzing in real time the captured image/video, and determining the correct filters and composition instructions required to arrive at the desired effect. For example, analysis of the live stream may include edge detection analysis in order to track the boundaries of the Jumbotron during the live-stream. Edge detection analysis may be performed in a number of ways including through utilizing machine vision algorithms to detect patterns of sharp changes (e.g. in colors and/or brightness) in a field of pixels. Alternatively the edges of the Jumbotron may be inferred based on additional metadata sent along with the live stream from AT&T Park, including but not limited to the geolocation of the live streaming device, the orientation of the live streaming device, optical parameters (e.g. focal length) or the capturing device, and structural dimensions of the park structure itself. Analysis may further comprise detecting the image properties including, but not limited to, sharpness, color levels, tonal balance, or white balance, of the live stream images in order to define processing filters to match the captured images/video (or vice-versa). With the edges of the Jumbotron now defined, processing may be performed in real time on the video captured at the daughter's little league game including 3-D geometric transformations to match the perspective of the captured video to the perspective of the Jumbotron appearing in the live stream and filters applied to match the image qualities of the Jumbotron appearing in the live stream.

At steps five and six the overlay process may output overlays and/or the raw and/or processed captured image/video. As described previously each overlay may actually comprise a number of different elements including graphics, sound, and or text. In such situations overlay elements may be pre-composited and available as a pre-defined overlay or may be provided as a number of pre-defined overlays and composited in real time as the user captures image/video data. In either case, the provided overlays may be output as overlay files and referenced by a common definition file (e.g. a .vuu file) during the composition process with specific instructions regarding composition layer placement. Similarly where the overlay process reprocesses the captured image/video, the overlay process may manipulate a source image/video file (thereby eliminating the original), may output a manipulated copy of the source image/video data, or may output filters as a set of instructions within a filter file referable by a common definition file (e.g. a .vuu file) during the composition process.

Outputting the source captured image/video along with a common definition file and specific overlay and/or filter instructions would allow the user to go back to the manipulated image/video after capture and make adjustments to the applied overlays and/or filters. Similarly, it would allow the user to share the manipulated image/video with another user or group of users (for example via a social network platform) and have those other users easily make adjustments to the applied overlays/filters and apply their own filters/overlays.

Filter Processing

Embodiments of the present teaching may include applying selected filters to captured image/video data in real time. Here the application of filters may include any manipulations made to the captured image/video, including but not limited to, 2-D and 3-D geometric transformations, transparency operations, splicing and/or cropping, sharpening, color correction, and contrast adjustment. For example, a system in accordance with embodiments of the present teaching may present to the user an option to select a "Offset RGB" filter to apply to their captured video in real time. When selected, the Offset RGB filter may display the captured image/video in real time to the user with each color channel (red, blue and green) slightly offset from the other, thereby providing a creative visual effect.

According to certain embodiments, real-time filter processing may be performed by a software module or combination of software and hardware instantiated on a user device, on a remote device, on a number of devices in a distributed fashion, or any combination thereof. Filter processing functionality may be accessible via an application programming interface (API) thereby allowing different types of device and software platforms to access its functionality. According to some embodiments, a software module implementing filter processing may be instantiated completely or partially in microcode on the device hardware itself. According to some embodiments, the user may search for and download new pre-defined filters using a device. New pre-defined filters may be downloaded via a network from a platform server(s), directly from other users, or from third-party content providers.

Figure 8:
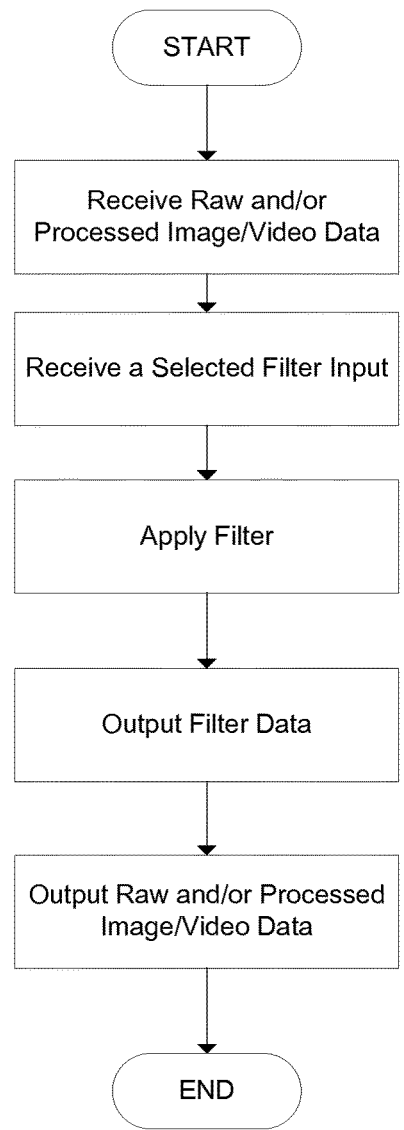
FIG. 8 shows a flow chart describing a method by which a filter may be applied to captured image/video data in real time, according to one embodiment.

FIG. 8 shows a flow chart describing a method by which a filter may be applied to captured image/video data in real time, according to one embodiment.

At step one, the filter process may comprise receiving captured raw and/or processed image/video data.

At step two, the filter process may comprise receiving input from a user and/or other process, selecting a particular filter to be applied to the captured image/video in real time. For example, a user may select a distortion filter to be applied in real time. Alternatively, another process (e.g. the Overlay process described in the previous section) may request a filter to be applied. For example, a 3-D geometric transform to overlay the captured image/video within a defined boundary (e.g. the boundaries of the large display screen in the previously described Times Square overlay example) in an overlay graphic.

At step three the filter process may comprise applying the filter to the captured image/video in real time. Real time application of filters (particularly those involving complex 3D transformations) may present challenges where hardware processing capabilities are limited. Complex graphical operations, such as 3D geometric transformations, may require the parallel processing capabilities of a graphics processing unit (GPU). A software module (e.g., an Overlay or Filter module) may include and/or reference software-based abstractions of a GPU rendering pipeline. For example, GPUImage is an available software-based abstraction of a GPU rendering pipeline that allows for real-time image/video processing via the integrated CPU/GPU chip hardware found on current generation iPhones®.

Alternatively real-time image/video processing may be performed remotely where the graphics processing capabilities of the capturing device are lacking, but connection to a low-latency network is available. For example, according to one embodiment, a user may capture image/video using a portable-multi function device. While capturing the image/video, the portable multi-function device may live stream, via a network, to remote computing devices or systems of remote computing devices. For example the device may live stream the captured image/video via a wireless network to a more powerful computer located in the same room or building as the user. Alternatively the device may live stream the captured image/video to a distributed GPU cloud computing platform (e.g. Amazon EC2). Complex filters and/or overlays may be applied remotely while the composited image/video is live-streamed back to the capturing device.

At step four and five the filter process may output filter data and/or the raw and/or processed captured image/video. As described in the previous section with regards to the overlay process, each filter may actually comprise a combination of filters. In such situations filters may be pre-composited and available as a pre-defined filter or may be provided as a number of pre-defined filters and composited in real time as the user captures image/video data. In either case, the provided filters may be output as filter files and referenced by a common definition file (e.g. a .vuu file) during the composition process with specific instructions regarding filter processing. According to some embodiments, the filter process may manipulate a source image/video file (thereby eliminating the original), may output a manipulated copy of the source image/video data, or may output filters as a set of instructions within a filter file referable by a common definition file (e.g. a .vuu file) during the composition process.

Outputting the source captured image/video along with a common definition file and specific filter instructions would allow the user to go back to the manipulated image/video after capture and make adjustments to the applied filters. Similarly, it would allow the user to share the manipulated image/video with another user or group of users (for example via a social network platform), allowing those other users to easily make adjustments to the applied filters and apply their own filters as well.

Image/Video Capture Interface

According to some embodiments, a system for composing real time image/video content with a portable multi-function device, may present the user with an interface for capturing image/video via the display of a portable multifunction device. The interface may present to the user visual feedback mechanisms provided by the Quality Engine as well as available processing options, for example available filters and/or overlays. The interface may be implemented providing image manipulation options with varying levels of complexity. For example a standard version of an application implementing the disclosed teachings may present to the user a limited list of available preset filters and overlays. Alternatively a pro version of an application implementing the disclosed teachings may present to the user more complex options for real-time processing of captured image/video data. For example a pro version may allow the user to fine tune the settings of the Image Engine. Similarly, a pro version may allow the user to access more complex functionality such as the "chroma key"-like the overlay effect previously described in more detail.

The image/video capture interface may also implement a randomizer. A randomizer when selected, may randomly apply overlays and/or filters in real time to the captured image/video thereby resulting in interesting effects that the user may not have previously considered.

Image/Video Library Viewer and Manipulation Interface

According to some embodiments, a system for composing real time image/video content with a portable multi-function device, may present the user with an image/video library viewing and manipulation interface. Once a user captures and composes real-time processed images/video, they may save the results to a library. It will be understood that the resulting processed image/video (including the source image/video and any necessary common definition files (e.g. .vuu files) may be saved locally on the capturing portable multi-function device and/or uploaded to a remote storage service (e.g. as part of social network platform). The user may then view and/or further manipulate the contents of their library via the device. The user may also view and manipulate images/videos from other users, for example those users that are members of one or more of the user's social networking circles.

According to one embodiment the image video library viewer and manipulation interface may be implemented as a Bubblizer. Images and/or video clips may be presented to the user inside circular or cube-shaped "bubbles" that may be pushed around the screen of the device using touch gestures. Each of the "bubbles" may represent and an image, an album of images, a video clip, and/or an album of video clips. According to some embodiments, the size of each bubble may correspond to the size of the associated video clip. According to some embodiments the bubbles, when pushed by the user, may move around the screen according to physics-based mechanics and may interact with each other. Interaction may include bouncing off of each other, popping each other, and or combining to form larger bubbles. According to some embodiments, such interactions may be used to manipulate the corresponding video clips. For example, a user may combine two clips by pushing the bubbles associated with the clips together to form a larger bubble. As another example, a user may delete a video clip by pressing the corresponding bubble aggressively thereby popping the bubble.

According to some embodiments the Bubblizer may implement gamification methods. For example, a points system may capture the user's actions and award certain points. For example, a user may be awarded points for combining two videos by pushing the bubbles together. The user may accumulate points which may be used to acquire or gain access to new overlays and/or filters.

A computer implemented method for manipulation and interaction with image and/or video content via a Bubblizer interface may include providing a graphical interface for presentation via a touch-screen display of a mobile device and generating and presenting graphical objects representing individual image or video clips, via the graphical interface. The graphical objects here would be the "bubbles" and may be presented visually as such. In some embodiments the bubble may be spherical and/or cubical and may include representation of the contents of the clip (e.g. a preview image or video clip). Each graphical object may be animated according to physics-based mechanics, by the one or more processors of the mobile device and respond to input via touch-based gestures. The resultant bubble interaction may include bouncing off of each other, popping each other, and or combining to form larger bubbles. As described, in some embodiments, when bubbles are combined their associated clips may be combined to form a new longer clip represented by the larger bubble.

Sharing Content

Once the user completes the capture operation they are free to modify the layered added content in order to obtain the best final composited video. Upon saving the content, the user is able to share the content through email or SMS Messaging or via a social media channel within the application or through various social network (e.g. facebook, twitter, etc.)

Portable Multi-Function Device

FIG. 9 is a block diagram illustrating an example mobile device or "portable multifunction device" 100 in accordance with some embodiments. The device 100 may include a memory 102 (which may include one or more computer readable storage mediums), a memory controller 122, one or more processing units 120 which may include central processing units (CPUs) and graphics processing units (GPUs), a peripherals interface 118, network communications interface 108, audio interface 110, a speaker 111 and/or microphone 113, a power supply 162, an external port 124, sensors 166, accelerometers 168, an input/output (I/O) subsystem 106, including an optical sensors controller 158, touch display controller 156, and other input controllers 160, and optical sensors devices (image capture devices) 164, a touch display 112, and other input or control devices 116. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIG. 9 may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. One or more processors 120 run or execute various software programs and/or sets of instructions stored in memory 102 to perform various functions for the device 100 and to process data.

In some embodiments, the peripherals interface 118, the processor(s) 120, and the memory controller 122 may be implemented on a single chip, such as a chip 104. In some other embodiments, they may be implemented on separate chips.

The network communications interface 108 may facilitate transmission and reception of communications signals often in the form of electromagnetic signals. The transmission and reception of electromagnetic communications signals may be carried out over physical media such copper wire cabling or fiber optic cabling, or may be carried out wirelessly for example, via a radiofrequency (RF) transceiver. In some embodiments the network communications interface may include RF circuitry. In such embodiments RF circuitry may convert electrical signals to/from electromagnetic signals and communicate with communications networks and other communications devices via the electromagnetic signals. The RF circuitry may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the network communications interface 108 by the peripherals interface 118.

The I/O subsystem 106 couples input/output peripherals on the device 100, such as a touch sensitive display system 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch sensitive display system 112 may have a touch-sensitive surface, sensor or set of sensors that accepts input from the user based on haptic and/or tactile contact. The touch sensitive display system 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 9 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 9 shows a proximity sensor 166 coupled to the peripherals interface 118. Alternately, the proximity sensor 166 may be coupled to an input controller 160 in the I/O subsystem 106.

The device 100 may also include one or more accelerometers 168. FIG. 9 shows an accelerometer 168 coupled to the peripherals interface 118. Alternately, the accelerometer 168 may be coupled to an input controller 160 in the I/O subsystem 106.

The device 100 may also include a global positioning system (GPS) receiver 115. FIG. 9 shows a GPS receiver 115 coupled to the peripherals interface 118. Alternately, the GPS receiver 115 may be coupled to an input controller 160 in the I/O subsystem 106. The GPS receiver 115 may receive signals from GPS satellites in orbit around the earth, calculate a distance to each of the GPS satellites (through the use of GPS software, e.g. GPS module 135), and thereby pinpoint a current global position of a device 100. In some embodiments, global positioning of the device 100 may be accomplished without GPS satellites through the use of similar techniques applied to cellular and/or Wi-Fi signals received from cellular and/or Wi-Fi antennae.

In some embodiments, the software components stored in memory 102 may include an operating system 126, a communication module (or set of instructions) 128, a contact/motion module (or set of instructions) 130, a graphics module (or set of instructions) 132, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the network communications interface 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.).

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detect contact on a touchpad.

The graphics module 132 includes various known software components for rendering and displaying graphics on the touch screen 112, including components for changing the intensity of graphics that are displayed. As used herein, the term "graphics" includes any object that can be displayed to a user, which may include, but not be limited by, text, web pages, icons (such as user-interface objects including soft keys), digital images, videos, animations and the like.

The text input module 134, which may be a component of the graphics module 132, provides soft keyboards for entering text in various applications (e.g., contacts 137, e-mail 140, IM 141, blogging 142, browser 147, and any other application that needs text input).

The GPS module (not shown) determines the location of the device and provides this information for use in various applications (e.g., to the camera 143 as picture/video metadata, and to applications that provide location-based services).

The applications 136 may include the following modules (or sets of instructions), or a subset or superset thereof:
  a camera module 143 for still and/or video images;
  a real time image/video composing module 144;
  a video player module 145;
  and other modules 155.

Examples of other applications 136 that may be stored in memory 102 include other word processing applications, JAVA-enabled applications, encryption, digital rights management, voice recognition, and voice replication.

In conjunction with touch screen 112, display controller 156, optical sensor(s) 164, optical sensor controller 158, contact module 130, graphics module 132, and image management module 144, the camera module 143 may be used to capture still images or video (including a video stream) and store these in memory 102, to modify characteristics of a still image or video, or to delete a still image or video from memory 102. Embodiments of user interfaces and associated processes using camera module 143 are described further below.

In conjunction with a touch screen 112, a display controller 156, a contact module 130, a graphics module 132, a text input module 134, and a camera module 143, an image management module (not shown) may be used to arrange, modify or otherwise manipulate, label, delete, present (e.g., in a digital slide show or album), and store still and/or video images. Embodiments of user interfaces and associated processes using image management module are described further below.

In conjunction with the touch screen 112, the display controller 156, the contact module 130, the graphics module 132, the audio circuitry 110, and the speaker 111, the video player module 145 may be used to display, present or otherwise play back videos (e.g., on the touch screen or on an external, connected display via external port 124). Embodiments of user interfaces and associated processes using video player module 145 are described further below.

In conjunction with the touch screen 112, the display system controller 156, the contact module 130, the graphics module 132, and a text input module (not shown), a search module (not shown) may be used to search for text, music, sound, image, video, and/or other files in memory 102 that match one or more search criteria (e.g., one or more user-specified search terms). Embodiments of user interfaces and associated processes using the search module (not shown) are described further below.

In conjunction with the touch screen 112, the display system controller 156, the contact module 130, the graphics module 132, the audio circuitry 110, the speaker 111, the communications interface 108, the text input module (not shown), an e-mail client module (not shown), and a browser module (not shown), an online video module (not shown) allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, an instant messaging module (not shown), rather than e-mail client module, is used to send a link to a particular online video.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

What is claimed is:

1. A computer-implemented method for composing video content with a mobile device, the mobile device including an image capture device, a display, and one or more processors, the method comprising:

capturing video via the image capture device;

applying, by the one or more processors, a Quality Engine (QE) process, wherein the QE process is configured to present a user of the mobile device with visual feedback via the display while video is captured via the image capture device, the visual feedback intended to improve video capture quality;

applying, by the one or more processors, an Image Engine (IE) process, wherein the IE process is configured to automatically adjust video capture to improve video capture quality based on a set of one or more known photography or cinematography techniques;

applying, by the one or more processors, an overlay process to the captured video, wherein the overlay process includes:

receiving a selection by a user of a graphical overlay to apply to the captured video, the selected graphical overlay including a live video stream captured at a physical location remote from the mobile device;

analyzing the selected graphical overlay to determine a characteristic of the selected graphical overlay, the determined characteristic of the selected graphical overlay including a geometric boundary of a physical objected captured in the live video stream; and applying graphical filters and/or transformations to the captured video to match the determined characteristic of the selected graphical overlay by applying a three-dimensional transformation to the captured video based on the geometric boundary of the physical objected captured in the live video stream such that, when composited, a transformed version of the captured video is displayed within the geometric boundary of the physical object in the live video stream; and displaying, via the display device, a composite of the selected graphical overlay and the captured video with the applied QE process, IE process, and overlay process.

2. The computer-implemented method of claim 1, wherein the QE process includes:

receiving the captured video;

analyzing the received captured video based on objective criteria and/or subjective criteria;

determining a quality level of the captured video based on the analysis;

determining a visual feedback based on the quality level, the visual feedback configured to direct the user to adjust video capture to improve the quality level of the captured video;

generating a graphical feedback overlay providing the visual feedback; and outputting the graphical feedback overlay.

3. The computer-implemented method of claim 2, wherein the graphical feedback overlay includes a graphical star rating system in which a number of stars increases as the quality level increases and decreases as the quality level decreases.

4. The computer implemented method of claim 2, wherein the subjective criteria includes a quality of the framing of the captured video and an orientation of one or more subjects in the captured video, and wherein the subjective criteria are based on historical poll data collected from a plurality of people.

5. The computer implemented method of claim 2, wherein the objective criteria includes one or more selected from the following: balance of tonal distribution, steadiness, color balance, color saturation, lighting variation, optical flow, face detection, red-eye detection, depth estimation, and silhouette estimation in the captured video.

6. The computer implemented method of claim 2, further comprising:

receiving sensor data from one or more sensors associated with the mobile device;

wherein the sensor data is incorporated into the analysis of the received captured video; and wherein the one or more sensors include one or more selected from the following:

accelerometer, gyroscope, ambient light sensor, magnetometer, depth sensor, and proximity sensor.

7. The computer-implemented method of claim 1, wherein the IE process includes:

receiving the captured video;

analyzing the received captured video based on objective criteria and/or subjective criteria;

determining a quality level of the captured video based on the analysis;

automatically adjusting one or more predetermined parameters based on a set of one or more known photography or cinematography techniques to adjust video capture;

wherein the adjustments are configured to improve the quality level of the video capture; and outputting the adjusted video.

8. The computer-implemented method of claim 1, further comprising:

saving data associated with the QE process, IE process, and overlay process into one or more common definition files;

wherein the one or more common definition files include instructions for compositing the data associated with the QE process, IE process, and overlay process, with the captured video.

9. The computer-implemented method of claim 8, wherein the one or more common definition files are saved to a cloud-based remote storage and shared with one or more other users.

10. A system for composing video content with a mobile device, the system comprising:

a mobile device including:

an image capture device; and a display;

one or more processors;

one or more memory units having instructions stored thereon, which when executed by the one or more processors, cause the system to:

capture video via the image capture device;

apply a Quality Engine (QE) process, wherein the QE process is configured to present a user of the mobile device with visual feedback via the display, while video is captured via the image capture device, the visual feedback intended to improve video capture quality;

apply an Image Engine (IE) process, wherein the IE process is configured to automatically adjust video capture to improve video capture quality based on a set of one or more known photography or cinematography techniques;

apply an overlay process to the captured video, wherein the overlay process includes:

receiving a selection by a user of a graphical overlay to apply to the captured video, the selected graphical overlay including a live video stream captured at a physical location remote from the mobile device;

analyzing the selected graphical overlay to determine a characteristic of the selected graphical overlay, the determined characteristic of the selected graphical overlay including a geometric boundary of a physical objected captured in the live video stream; and applying graphical filters and/or transformations to the captured video to match the determined characteristic of the selected graphical overlay by applying a three-dimensional transformation to the captured video based on the geometric boundary of the physical objected captured in the live video stream such that, when composited, a transformed version of the captured video is displayed within the geometric boundary of the physical object in the live video stream; and display, via the display device, the captured video with the applied QE process, IE process, and overlay process.

11. The system of claim 10, wherein the QE process includes:

receiving the captured video;

analyzing the received captured video based on objective criteria and/or subjective criteria;

determining a quality level of the captured video based on the analysis;

determining a visual feedback based on the quality level, the visual feedback configured to direct the user to adjust video capture to improve the quality level of the captured video;

generating a graphical feedback overlay providing the visual feedback; and outputting the graphical feedback overlay.

12. The system of claim 11, wherein the graphical feedback overlay includes a graphical star rating system in which a number of stars increases as the quality level increases and decreases as the quality level decreases.

13. The system of claim 11, wherein the subjective criteria includes a quality of the framing of the captured video and an orientation of one or more subjects in the captured video, and wherein the subjective criteria are based on historical poll data collected from a plurality of people.

14. The system of claim 11, wherein the objective criteria includes one or more selected from the following: balance of tonal distribution, steadiness, color balance, color saturation, lighting variation, optical flow, face detection, red-eye detection, depth estimation, and silhouette estimation in the captured video.

15. The system of claim 11, further comprising:

one or more sensors associated with the mobile device;

wherein, the QE process further includes:

receiving sensor data from the one or more sensors associated with the mobile device;

wherein the sensor data is incorporated into the analysis of the received captured video;

wherein the one or more sensors include one or more selected from the following:

accelerometer, gyroscope, ambient light sensor, magnetometer, depth sensor, and proximity sensor.

16. The system of claim 10, wherein the IE process includes:

receiving the captured video;

analyzing the received captured video based on objective criteria and/or subjective criteria;

determining a quality level of the captured video based on the analysis;

automatically adjusting one or more predetermined parameters based on a set of one or more known photography or cinematography techniques to adjust video capture;

wherein the adjustments are configured to improve the quality level of the video capture; and outputting the adjusted video.

17. The system of claim 10, wherein the one or more memory units have further instructions stored thereon, which when executed by the one or more processors, cause the system to further:

save data associated with the QE process, IE process, and overlay process into one or more common definition files;

wherein the one or more common definition files include instructions for compositing the data associated with the QE process, IE process, and overlay process, with the captured video.

18. The computer-implemented method of claim 17, wherein the one or more common definition files are saved to a cloud-based remote storage and shared with one or more other users.

19. A non-transitory computer computer-readable medium having instructions stored thereon, which when executed by a mobile computing device, cause the mobile computing device to:

capture video via an image capture device;

apply a Quality Engine (QE) process, wherein the QE process is configured to present a user of the mobile computing device with visual feedback via a display of the mobile computing device while video is captured via the image capture device, the visual feedback intended to improve video capture quality;

apply an Image Engine (IE) process, wherein the IE process is configured to automatically adjust video capture to improve video capture quality based on a set of one or more known photography or cinematography techniques;

apply an overlay process to the captured video, wherein the overlay process includes:

receiving a selection by a user of a graphical overlay to apply to the captured video, the selected graphical overlay including a live video stream captured at a physical location remote from the mobile device;

analyzing the selected graphical overlay to determine a characteristic of the selected graphical overlay, the determined characteristic of the selected graphical overlay including a geometric boundary of a physical objected captured in the live video stream; and applying graphical filters and/or transformations to the captured video to match the determined characteristic of the selected graphical overlay by applying a three-dimensional transformation to the captured video based on the geometric boundary of the physical objected captured in the live video stream such that when composited, a transformed version of the captured video is displayed within the geometric boundary of the physical object in the live video stream; and display, via the display device, a composite of the selected graphical overlay and the captured video with the applied QE process, IE process, and overlay process.

* * * * *